(12) United States Patent
Rajagopalan

(10) Patent No.: US 6,207,760 B1
(45) Date of Patent: Mar. 27, 2001

(54) GOLF BALL COVER COMPOSITIONS

(75) Inventor: Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/186,399

(22) Filed: Nov. 5, 1998

Related U.S. Application Data

(63) Continuation-in-part of application No. 08/806,572, filed on Feb. 25, 1997, now abandoned.

(51) Int. Cl.$^7$ ............................. A63B 37/12; A63B 37/00
(52) U.S. Cl. ........................ 525/221; 525/196; 525/201; 473/372; 473/373; 473/385
(58) Field of Search ................................ 525/196, 201, 525/221; 473/372, 373, 385

(56) References Cited

U.S. PATENT DOCUMENTS

| | | | |
|---|---|---|---|
| 3,264,272 | 8/1966 | Rees | 260/78.5 |
| 3,454,280 | 7/1969 | Harrison | 273/235 |
| 3,819,768 | 6/1974 | Molitor | 260/897 |
| 4,274,637 | * 6/1981 | Molitor . | |
| 4,526,375 | 7/1985 | Nakade | 273/235 |
| 4,801,649 | 1/1989 | Statz | 525/183 |
| 4,884,814 | 12/1989 | Sullivan | 273/235 |
| 4,911,451 | 3/1990 | Sullivan et al. | 273/235 |
| 5,000,459 | 3/1991 | Isaac | 273/235 |
| 5,120,791 | 6/1992 | Sullivan | 525/196 |
| 5,298,571 | 3/1994 | Statz et al. | 525/196 |
| 5,324,783 | 6/1994 | Sullivan | 525/196 |
| 5,328,959 | 7/1994 | Sullivan | 525/196 |
| 5,397,840 | 3/1995 | Sullivan et al. | 525/221 |
| 5,415,937 | 5/1995 | Cadorniga et al. | 428/407 |
| 5,492,972 | 2/1996 | Stefani | 525/196 |
| 5,691,418 | * 11/1997 | Hagman . | |

FOREIGN PATENT DOCUMENTS

| | | |
|---|---|---|
| 2286594 | 8/1995 | (GB) . |
| 2311293 | 9/1997 | (GB) . |
| 2316624 | * 3/1998 | (GB) . |
| 000248 | * 1/1998 | (JP) . |
| 24204 | 10/1994 | (WO) . |
| 02318 | 1/1997 | (WO) . |

OTHER PUBLICATIONS

Research Disclosure, 27221 E.I. DuPont de Nemours & Co., Inc., Dec. 1986.

* cited by examiner

Primary Examiner—David J. Buttner
(74) Attorney, Agent, or Firm—Pennie & Edmonds LLP

(57) ABSTRACT

The present invention relates to a golf ball having at least one layer formed from at least one soft magnesium ionomer having a flexural modulus of no more than 4,000 psi, where the layer has a hardness of no more than 90 Shore C, and is substantially free of any ionomers neutralized by a metal ion other than magnesium. The layer may also contain at least one hard magnesium ionomer. The hard magnesium ionomer is typically a copolymer of ethylene and acrylic or methacrylic acid, having an acid content of from about 10 to about 30 percent by weight, wherein from about 30 to about 70 percent of the acid groups are neutralized with magnesium cations, and has a flexural modulus of at least about 50,000 psi and a Shore D hardness of at least about 60. The preferred soft magnesium ionomer is a copolymer of ethylene, acrylic acid or methacrylic acid, and n-butylacrylate or iso-butylacrylate, having an acid content of from about 7 to about 15 percent by weight, and no more than about 0.4 percent by weight magnesium based on the total weight of the ionomer. The invention also relates to a method of making a golf ball, using at least one soft magnesium ionomer to form a layer in a golf ball.

25 Claims, 2 Drawing Sheets

GOLF BALL COVER COMPOSITIONS

CROSS REFERENCE TO RELATED APPLICATION

This application is a continuation-in-part of U.S. patent application Ser. No. 08/806,572, filed Feb. 25, 1997 now abandoned.

FIELD OF THE INVENTION

This invention relates generally to golf balls and, in particular, to golf ball compositions comprising blends containing soft, very low flexural modulus magnesium ionomers that are substantially free of ionomers neutralized with metal ions other than magnesium. The golf ball compositions of the invention provide golf balls having unexpectedly improved durability when compared to prior art golf balls that utilize blends of ionomers containing more than one type of metal ion.

BACKGROUND OF THE INVENTION

A majority of golf balls sold today have covers formed either of balata or a blend comprising one or more ionomers. Balata covered, wound balls are typically preferred by skilled golfers because such balls have a high spin rate, allowing skilled players to draw or fade the ball, and to stop the ball quickly on the green with approach shots. However, balls with balata covers are expensive, and are easily cut or otherwise damaged when miss-hit, e.g., by a less than skilled player.

Therefore, most amateur golfers prefer two-piece golf balls having covers which comprise an ionomer or ionomer blend. Two-piece balls with ionomer covers are less expensive than wound, balata covered balls, and are highly resistant to cutting or other damage. However, these balls have a hard feel and a low spin rate when compared to balata covered balls, so that they are more difficult to control.

Although golf ball manufacturers have attempted to produce golf ball covers that provide the spin rate of balata with the cut resistance of an ionomer, i.e., a copolymer of an α-olefin and an α,β-unsaturated carboxylic acid, by forming blends of ionomers that differ in hardness, acid content, and in the metal atom used to neutralize the carboxylic acid groups on the polymer chain, none of these attempts have been fully successful.

U.S. Pat. No. 3,819,768 to Molitor discloses golf ball covers comprising blends of zinc and sodium ionomers, which overcome cold cracking problems.

U.S. Pat. No. 4,526,375 to Nakade discloses covers comprising a single ionomer in which part of the carboxylic acid groups has been neutralized with sodium and another part has been neutralized with magnesium or zinc to overcome a fatigue fracture problem in covers comprising sodium/zinc ionomer blends, as well as a cold cracking problem in covers comprising a single ionomer.

U.S. Pat. No. 5,000,459 to Issac discloses golf ball covers made from a lithium ionomer resin, wherein up to 50 percent of the lithium ionomer resin is replaced with at least one sodium ionomer resin. The resulting golf balls are found to be comparable in durability and initial velocity to golf balls having a cover with lithium ionomer only.

U.S. Pat. No. 4,911,451 to Sullivan et al. discloses a golf ball cover including about 10 to 90 percent by weight of an ethylene-acrylic acid copolymer, containing about 11 percent by weight acrylic acid with about 40 percent of the carboxylic acid groups neutralized with sodium, and about 90 to 10 percent by weight of at least one ethylene-acrylic acid copolymer, containing about 11 to 16 percent acrylic acid with about 10 to 40 percent of the carboxylic acid groups neutralized with zinc. Although not exemplified or even further discussed, ionomers neutralized with metal ions other than zinc and sodium are also disclosed. The exemplified golf balls are said to have the durability of balls having ethylene-methacrylic acid ionomer covers, but with an improved coefficient of restitution.

U.S. Pat. No. 5,492,972 to Stefani discloses a golf ball cover composition of a blend comprising 95 to 50 parts by weight based on 100 parts by weight resin (phr) of a low flexural modulus sodium ionomer resin and about 5 to 50 phr of a lithium ionomer resin. In addition, a second sodium ionomer, having a flexural modulus and melt flow index that are different from that of the first sodium ionomer, can be added to the blend. The spin rate of such a ball is improved over typical two-piece balls, and approaches the spin rate of a wound, balata covered ball. However, the initial velocity of the disclosed golf balls is less than that of two-piece balls having covers comprising a lithium ionomer.

U.S. Pat. No. 4,884,814 to Sullivan discloses golf ball covers comprising blends of a high flexural modulus ("hard") ionomer and a low flexural modulus ("soft") ionomer. The hard ionomers are copolymers of an olefin and an unsaturated monocarboxylic acid, neutralized with sodium or zinc, and have a flexural modulus of about 30,000 to 55,000 p.s.i. and a Shore D hardness of about 60 to 66. The soft ionomers are terpolymers of an olefin, an unsaturated monocarboxylic acid, and an acrylate ester. These terpolymers are neutralized with zinc or sodium, and have a flexural modulus of about 3,000 to 7,000 p.s.i. and a Shore D hardness of about 25 to 40. The resulting cover is disclosed as being intermediate between balata and hard Surlyn in softness to such a degree that adequate spin can be imparted to the ball by a skilled golfer.

U.S. Pat. No. 5,120,791 to Sullivan discloses golf ball cover compositions that provide enhanced carrying distance when compared to the golf balls of U.S. Pat. No. 4,884,814 without sacrificing playability or durability. The disclosed compositions are blends of at least one hard ionomeric resin, preferably an acrylic acid ionomer, and at least one acrylic acid based soft ionomer. Hard ionomers neutralized with sodium, zinc, magnesium, or lithium, having a flexural modulus of 15,000 to 70,000 p.s.i. and a Shore D hardness of greater than 50 are disclosed. However, only zinc and sodium ionomers are exemplified. The disclosed soft ionomers are sodium or zinc neutralized terpolymers of an olefin, acrylic acid, and an unsaturated acrylate ester monomer, and have a flexural modulus of about 2,000 to 10,000 p.s.i. and a Shore D hardness of about 20 to 40. Golf balls having such cover blends reportedly have an improved coefficient of restitution and spin rate when compared to prior art golf balls having covers with hard-soft ionomer blends.

U.S. Pat. No. 5,415,937 to Cadorniga et al. discloses a golf ball cover material of a blend of 80–50 percent of a high stiffness ionomer and 20 to 50 percent of a very low modulus ionomer ("VLMI") to improve the feel and playability of the ball when compared to a standard ionomer cover, while retaining the distance and resilience of the prior art balls. High stiffness ionomers are defined as a copolymer of 75 to 80 percent of an olefin and 20 to 25 percent of an α,β-ethylenically unsaturated carboxylic acid, having 10 to 90 percent of the acid groups neutralized with sodium, lithium, zinc, or magnesium. The high stiffness ionomers preferably have a melt index of 0.5 to 5.0 g/10 min., a Shore D hardness of at least 70, and a flexural modulus of 60,000 to 120,000 psi. The VLMI are defined as terpolymers, consisting of 67 to 70 percent by weight of ethylene, 20 to 23 percent by weight of n- or iso-butyl-acrylate, and 10 percent by weight of methacrylic acid, where 10 to 90 percent of the acid groups are neutralized by sodium, zinc, or lithium. The VLMI preferably have a melt index of 0.5 to 10 g/10 min, a Shore D hardness of 20 to 50, and a flexural modulus of 2,000 to 8,000. Golf balls having covers incorporating the disclosed blends have a slightly improved coefficient of restitution and initial velocity with spin rates that range from slightly better than prior art blends to significantly lower, depending upon the particular blend and the club used in the test, i.e., driver, 5-iron, or pitching wedge.

U.S. Pat. No. 5,324,783 to Sullivan discloses golf ball covers having an intermediate modulus with improved distance. The covers include a blend of a "relatively low amount", i.e., about 10 to 30 weight percent, of soft ionomer resins and about 90 to 70 weight percent of hard ionomer resins. The soft ionomers are terpolymers of an olefin, acrylic or methacrylic acid, and an unsaturated acrylate ester. Although U.S. Pat. No. 5,324,783 discloses hard and soft ionomers neutralized with sodium, zinc, magnesium, and lithium, only blends of sodium and zinc ionomers are exemplified and discussed. Golf balls incorporating the disclosed cover composition have an improved spin rate compared to balls incorporating only hard ionomers.

British Patent No. GB 2,286,594 to Egashira discloses golf balls having covers formed from a blend of a hard magnesium ionomer, an ethylene-methacrylic acid-unsaturated carboxylate terpolymer, and a hard lithium ionomer. There is no disclosure of blends of ionomers neutralized with a single type of metal ion.

WO 94/240204 to Iwase et al. discloses golf balls having covers formed from a blend of a hard magnesium ionomer, an ethylene-methacrylic acid-isobutyl terpolymer, and a hard lithium ionomer. Preferably, at least one ionomer containing a monovalent cation is blended with a magnesium ionomer. Again, there is no disclosure of blends of ionomers neutralized with a single type of metal ion.

U.S. Pat. No. 5,691,418 and WO 97/02318 to Hagman and Statz, which have identical disclosures, disclose golf balls comprising blends of a soft ionomer terpolymer, i.e., a VLMI, and a hard ionomer, where the ionomer terpolymer and the hard ionomer are both neutralized with lithium or magnesium, where soft lithium ionomers are preferred over a soft magnesium ionomers. The disclosed soft ionomers have a flexural modulus in the range of about 5,000 to about 35,000 psi. Although there is a teaching that soft ionomers having a flexural modulus higher than 35,000 may be produced, there is no disclosure that soft ionomers having a flexural modulus of less than about 5,000 psi are desirable, or are even possible. Moreover, the disclosure states that soft ionomers having a flexural modulus of less than 10,000 psi should be blended with a hard ionomer so that the final flexural modulus is at least 10,000 to 35,000 psi or higher.

U.S. Pat. No. 5,688,869 to Sullivan discloses golf ball cover compositions containing a blend of a metal cation neutralized high acid ionomer resin and a soft ionomer resin containing an acrylate ester class comonomer. Disclosed metal cations include ions of sodium, zinc, manganese, lithium, potassium, magnesium, calcium, and nickel. The disclosed soft ionomers have a hardness of from about 20 to about 40 Shore D and a flexural modulus of from about 1,500 to 15,000 psi. However, specific ionomers having a flexural modulus of 1,500 are not disclosed, and there is no teaching of which metal cations will provide such a low flexural modulus. Cover compositions formed by blending a high acid copolymer of ethylene and acrylic acid with a terpolymer of ethylene, acrylic or methacrylic acid, and an acrylate or methacrylate class ester are also disclosed. The blend of acid polymers is then neutralized with 3 to 4 parts by weight magnesium oxide based on 100 part of the acid polymers to form a blend of magnesium ionomers. However, although the flexural modulus of each of the resulting hard and soft ionomers and that of the resulting blend is not disclosed, the hardness of the resulting cover compositions is at least 93 Shore C.

Therefore, a need exists for golf ball compositions having improved durability and spin characteristics, as well as the initial velocity and carry of two-piece balls having a hard ionomer cover. The present invention provides such golf ball compositions.

SUMMARY OF THE INVENTION

The present invention relates to a golf ball having at least one foamed or unfoamed layer, which comprises at least one soft magnesium ionomer, and is substantially free of any ionomer comprising metal ions other than magnesium. The layer may be a part of any of a cover, a core, or a mantle layer positioned between a cover and a core. The soft magnesium ionomer is formed from a copolymer of an olefin, an $\alpha,\beta$-ethylenically unsaturated carboxylic acid, and, optionally, at least one acrylate or methacrylate class ester, wherein at least a portion of the acid units are neutralized by magnesium cations, and wherein the at least one soft magnesium ionomer contains no more than about 0.4 percent by weight magnesium based on the total weight of the ionomer. The at least one soft magnesium ionomer has a flexural modulus of no more than 4,000 psi, and the layer has a hardness of no more than 90 Shore C. Preferably, the at least one soft magnesium ionomer has a flexural modulus of no more than about 3,500 psi, more preferably, from about 3,200 to about 3,400 psi, and contains no more than about 0.4 percent by weight, more preferably, no more than 0.35 percent by weight, and, most preferably, from about 0.25 to about 0.35 percent by weight, magnesium.

Preferably, the layer further comprises at least one hard magnesium ionomer having a flexural modulus of at least about 50,000 psi and a Shore D hardness of at least about 60, such that the layer comprises a blend of from about 95 to about 30 weight percent, preferably from about 80 to about 40 weight percent, most preferably from about 60 to about 40 weight percent, of at least one hard magnesium ionomer and from about 5 to about 70 weight percent, preferably from about 20 to about 60 weight percent, most preferably from about 40 to about 60 weight percent, of at least one soft magnesium ionomer.

Typically, the hard magnesium ionomer is a copolymer of ethylene and acrylic or methacrylic acid, having an acid content of from about 10 to about 30 percent by weight, wherein from about 30 to about 70 percent of the acid groups are neutralized with magnesium cations. Preferably the hard magnesium ionomer has an acid content of from about 15 to about 25 percent by weight, a flexural modulus of at least about 50,000 psi, and a Shore D hardness of at least about 60. Preferably, the soft magnesium ionomer is a terpolymer of ethylene acrylic acid or methacrylic acid, and n-butylacrylate or iso-butylacrylate, having an acid content of from about 7 to about 15 percent by weight, and a flexural modulus of no more than 4,000 psi.

The invention also relates to a method of making a golf ball, comprising forming a golf ball composition of a blend comprising a soft magnesium ionomer and, optionally, a hard magnesium ionomer, as described above, and molding the composition to form a layer in a golf ball.

DETAILED DESCRIPTION OF THE INVENTION

Figure 1:
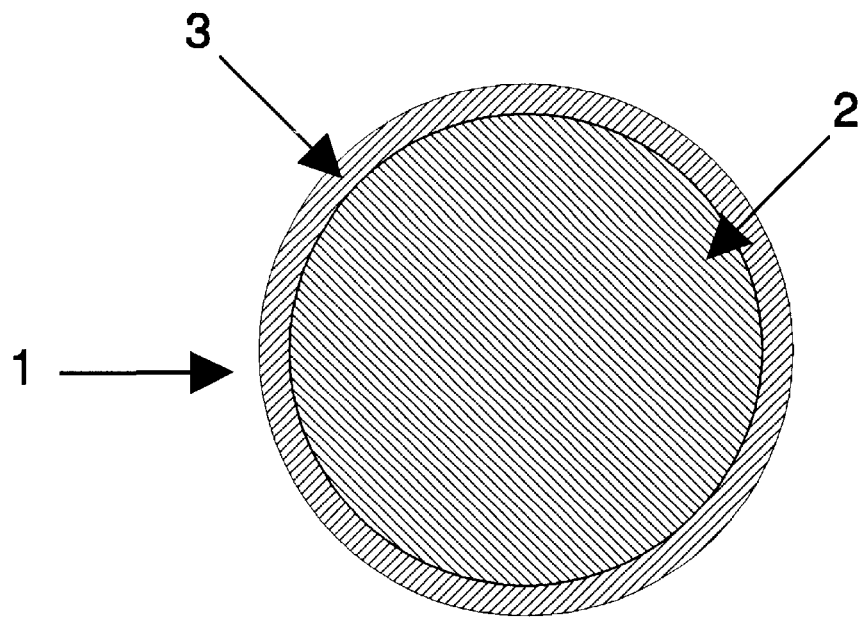
FIG. 1 is a cross-sectional view of a two-piece golf ball according to the invention with a one-piece core.

As used herein, the term "soft ionomer" refers to ionomers having a flexural modulus of no more than 4,000 psi. Soft magnesium ionomers may be formed from copolymers of an olefin and an α,β-ethylenically unsaturated carboxylic acid, where at least a portion of the carboxylic acid groups are neutralized with magnesium to provide an ionomer having the required flexural modulus. However, the soft magnesium ionomers of the invention are typically Very Low Modulus Ionomers or VLMIs, which are copolymers of an α-olefin, such as ethylene, a softening agent, such as n- or iso-butyl-acrylate, and an α,β-unsaturated carboxylic acid, such as acrylic or methacrylic acid, where at least part of the acid groups are neutralized by a magnesium cation.

As used herein, the term "hard ionomer" refers to ionomers having a Shore D hardness of at least about 60, as measured with ASTM method D-2240, and a flexural modulus, as measured with ASTM method D-790, of at least about 50,000 psi.

As used herein, the term "layer" includes any generally spherical portion of a golf ball or golf ball cover, core, center, or mantle, including one-piece cores and one-piece balls. A "mantle" is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein. Layers and mantles may be foamed or unfoamed.

The present invention relates to golf balls having unexpectedly improved durability and spin characteristics, as well as the coefficient of restitution ("COR"), initial velocity, and carry of two-piece balls having a hard ionomer cover. The golf balls of the invention comprise at least one layer, where the layer has a hardness of no more than 90 Shore C, and comprises at least one soft magnesium ionomer that has a flexural modulus of from about 2,000 to 20,000 psi, such as, for example, about 4,600 psi, and contains no more than about 0.4 percent magnesium based on the total weight of the ionomer. In another embodiment, the soft magnesium ionomer has a flexural modulus of no more than 4,000 psi, and contains no more than about 0.4 percent by weight magnesium based on the total weight of the ionomer. In addition, the layer is substantially free of any ionomer comprising metal ions other than magnesium. Although the soft ionomer may be a copolymer of an olefin and an α,β-ethylenically unsaturated carboxylic acid, where at least a portion of the acid units are neutralized by magnesium cations, the soft is preferably a magnesium Very Low Modulus Ionomer or VLMI, i.e., a copolymer of an α-olefin, an acrylate or methacrylate softening agent, and an α,β-unsaturated carboxylic acid, where at least part of the acid groups are neutralized by magnesium ions. Preferably the soft magnesium ionomer is blended with at least one hard magnesium ionomer. Golf balls of the invention incorporating at least one layer comprising a soft magnesium ionomer have unexpectedly improved durability and initial velocity, as well as similar or improved playability, when compared to prior art ionomer blends that contain ionomers that are neutralized with metal ions other than or in addition to magnesium. It is believed that the unexpectedly improved durability and golf ball properties of the present invention result from the improved compatibility of ionomers that only contain magnesium, when compared to blends of ionomers neutralized with two or more different metal ions.

Typically, the layer of the golf ball of the invention comprises a blend of from about 95 to about 30 weight percent of at least one hard magnesium ionomer, preferably from about 90 to about 40 weight percent, more preferably from about 80 to about 40 weight percent, most preferably from about 60 to about 40 weight percent, and from about 5 to about 70 weight percent of at least one soft magnesium ionomer, preferably from about 10 to about 60 weight percent, more preferably from about 20 to about 60 weight percent, most preferably from about 40 to about 60 weight percent.

The hard, i.e., high flexural modulus, magnesium neutralized ionomers useful in the golf ball compositions of the invention have a Shore D hardness of at least about 60, as measured with ASTM method D-2240, a flexural modulus, as measured with ASTM method D-790, of at least 50,000 psi, preferably from about 50,000 to about 80,000 psi, and a melt index from about 0.5 to about 5.0 g/ 10 min.

The hard magnesium ionomers are copolymers of an olefin and an unsaturated carboxylic acid, wherein about 30 to about 70 percent of the acid groups are neutralized with magnesium. Preferably, the hard magnesium ionomers are copolymers of ethylene and either acrylic or methacrylic acid, most preferably methacrylic acid. The acid content of the hard magnesium ionomers useful in the invention typically ranges from about 10 to about 30 percent by weight, and preferably from about 15 to about 25 percent.

Hard magnesium ionomers useful in the invention are available from the E.I. Du Pont de Nemours Company. In particular, SURLYN® AD8172 has provided good results. SURLYN® AD8172 is a copolymer of ethylene and methacrylic acid, wherein the acid content is about 15 percent by weight, and about 40 to 60 percent of the acid groups are neutralized with magnesium cations.

Soft magnesium ionomers useful in the golf balls of the invention are copolymers of an olefin, such as ethylene, acrylic or methacrylic acid, and, optionally, n- or iso-butyl acrylate, wherein the acid content ranges from about 7 to about 15 percent by weight, and the ionomer contains no more than about 0.4 percent by weight magnesium, based on the total weight of the ionomer. Preferably, no more than about 30 percent of the acid groups in the ionomer are neutralized. The soft magnesium ionomers useful in the invention may be formed by blending magnesium oxide, magnesium hydroxide, or a magnesium salt, such as magnesium acetate, with a melt of an appropriate acid copolymer, such as Nucrel® RX9-1, a copolymer of ethylene, n-butyl acrylate and methacrylic acid available from DuPont. Preferably, the acid copolymer comprises from about 67 to about 70 percent by weight ethylene, from about 20 to 23 percent by weight n-butyl acrylate, and from about 7.5 to 10.5 percent by weight methacrylic acid. During the blending process, the magnesium compound reacts with the acid groups of the acid copolymer to form the soft magnesium ionomer, and a gaseous byproduct, such as water or acetic acid, that is expelled from the melt during processing.

The soft magnesium ionomers and magnesium ionomer blends of the invention may be foamed during molding by any conventional foaming or blowing agent. The soft magnesium ionomers and ionomer blends may be thermoformed, and, thus, can be either compression or injection molded to form a foamed or unfoamed layer in the cover, core, and/or mantle of a golf ball according to the invention. The golf ball compositions of the invention allow highly durable golf balls to be produced with improved performance, feel, and spin rate, as shown in the accompanying Examples.

Golf balls according to the invention may incorporate cores comprising a soft magnesium ionomer or any other golf ball core material known in the art. The cores may be either one-piece, formed of a unitary mass of foamed or unfoamed material, or multi-piece, comprising a liquid, solid, or hollow core or center and one or more layers surrounding the core or center in which any of the center or at least one of the layers comprises a foamed or unfoamed soft magnesium ionomer or magnesium ionomer blend.

For example, FIG. 1 illustrates a golf ball according to the invention with a one-piece core. Golf ball 1 comprises a core 2 and a cover 3, wherein either of core 2 or cover 3 incorporates at least one layer comprising a foamed or unfoamed soft magnesium ionomer or magnesium ionomer blend.

Figure 2:
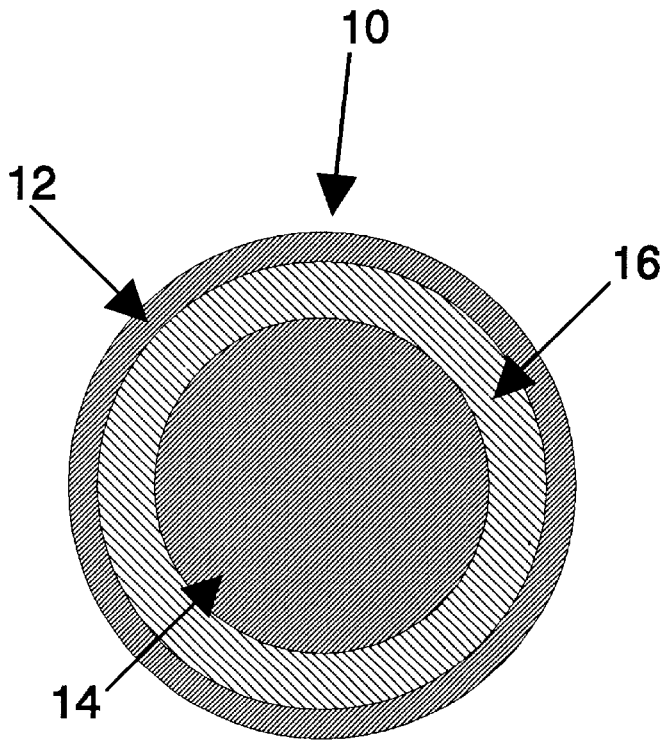
FIG. 2 is a cross-sectional view of a golf ball according to the invention incorporating a dual core.

Similarly, FIG. 2 illustrates a golf ball according to the invention incorporating a multi-piece core. Golf ball 10 comprises a cover 12, a core having a center 14 and at least one additional core layer 16. Any of the cover 12, center 14, or core layer 16 may incorporate at least one layer of a foamed or unfoamed soft magnesium ionomer or magnesium ionomer blend.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least 40 percent. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, zinc carbonate, metal, glass spheres, and the like. Golf balls of the invention may also have conventional wound cores.

Figure 3:
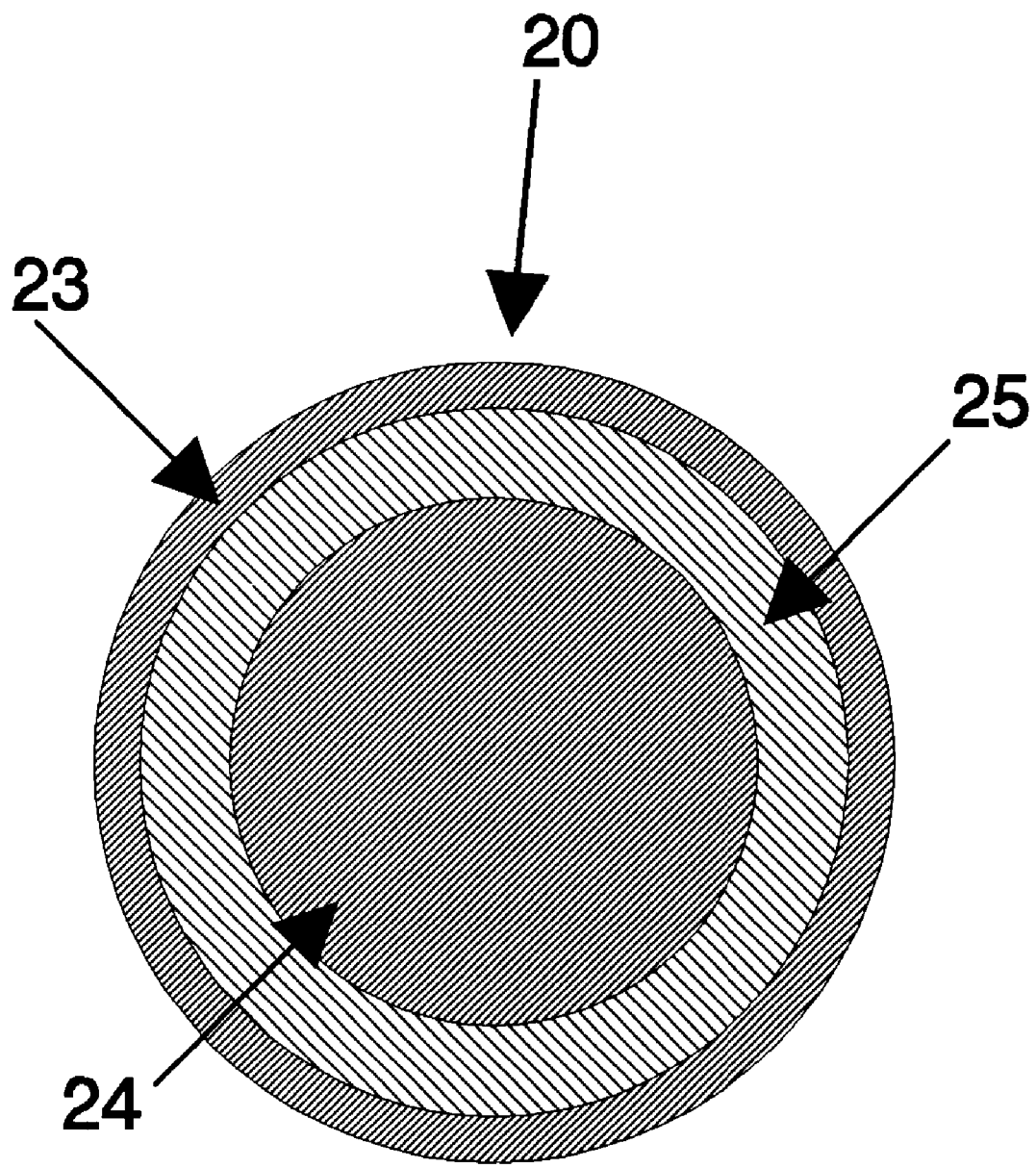
FIG. 3 is a cross-sectional view of a golf ball according to the invention incorporating a mantle layer between the cover and the core.

Golf balls of the invention may also include a mantle layer situated between the cover and the core. Preferably, the mantle layer comprises a least one layer comprising a foamed or unfoamed soft magnesium ionomer or magnesium ionomer blend, but may also be formed from any other suitable polymeric material having the desired properties. A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least one layer of a foamed or unfoamed soft magnesium ionomer or magnesium ionomer blend. Moreover, core 24 may be a one-piece core, a multi-layer core, or a wound core, having a solid, liquid, or hollow center.

Golf balls according to the invention, such as those shown in FIGS. 1 to 3, may also incorporate cover layers comprising foamed or unfoamed soft magnesium ionomers or magnesium ionomer blends, or conventional materials, including balata and ionomer cover stock. Foamed or unfoamed soft magnesium ionomer or magnesium ionomer blend cover layers according to the invention may be used with conventional solid or wound cores, as well as with cores foamed or unfoamed soft magnesium ionomer or magnesium ionomer blends, or other golf ball core materials. Preferably, the cover layer of a golf ball according to the invention is formed from a blend comprising at least one soft magnesium ionomer and at least one hard magnesium ionomer, where the layer has a hardness of no more than 90 Shore C.

Additional materials conventionally included in golf ball compositions may be added to the golf ball compositions of the invention. These additional materials include, but are not limited to, dyes, whitening agents, UV absorbers, optical brighteners, processing aids, density increasing or decreasing fillers, and other conventional additives. Antioxidants, stabilizers, softening agents, plasticizers, processing aids, and reinforcing materials can also be added. The golf ball compositions of the invention may also include other thermoplastic materials, including, but not limited to non-ionomeric polymers and thermoset materials.

Golf balls of the invention can be made in any conventional manner, including injection molding stock formed from a blend comprising the soft magnesium ionomer of the invention to form a layer in the core, cover, or in a mantle situated between the cover and the core. Layers in the golf balls of the invention may also be formed by compression molding pre-formed half-shells comprising the soft magnesium ionomer into a half-shell mold in a conventional manner.

After molding, golf balls comprising a layer containing the soft magnesium ionomer of the invention can be finished by buffing, painting, and stamping. Good results have been obtained by placing a mixture of the ionomer resins in a solid, pelletized form in a hopper used to feed the heated barrel of a conventional injection molding machine, which is used to make preformed half-shells for compression molding or directly forming the cover around a core in an injection mold.

EXAMPLES

The following non-limiting examples are intended to illustrate the preferred embodiments of the present invention, and are not to be construed as limiting the invention, the scope of which is defined by the appended claims.

Golf balls having covers according to the invention were prepared, and compared to golf balls having prior art covers. The blends used in the covers of the tested balls are given in Table 1, in which the amounts are given in weight percent.

Examples 1 through 4 were produced using a Werner & Pfleiderer ZSK-30 twin-screw extruder. Nucrel RX9-1 was fed into the main hopper of the extruder, the temperature of the nine barrels were maintained in the range of from 350 to 375° F., and the screw speed screw was maintained at about 200 rpm. Magnesium oxide was added through the side-feeder of one of the barrels, and side-products, such as water, were removed under vacuum during the neutralization process. Surlyn® 8542, a relatively soft commercial magnesium ionomer available from DuPont is listed in Table 1 as a control for comparison purposes.

TABLE 1

Properties of Very Low Modules Magnesium Ionomers

| Ingredients | Exp. 1 | Exp. 2 | Exp. 3 | Exp. 4 | Control Surlyn ® 8542 (DuPont Mg ionomer) |
|---|---|---|---|---|---|
| Nucrel RX9-1 (E-nBA-8.5 to 10.5 wt % MAA copolymer 38 Shore C) (wt %) | 98.7 | 99.0 | 99.3 | 99.5 | |
| Magnesium Oxide (wt %) (Maglite D from CP Hall, IL) | 1.3 | 1.0 | 0.7 | 0.5 | |
| Flexural Modulus after 40 hrs (psi) (ASTM) D790-Method II/ Proce. B) | 5910 | 4930 | 3370 | 3240 | 6300 |
| Hardness (Shore C) (at least two weeks aged) | 69 | 66 | 55 | 53 | 71 |
| Hardness (Shore D) (after 40 hrs aged) | 40 | 38 | 33 | 30 | 40 |
| Mol % neutralization (theoretical target) | 66 | 49 | 33 | 25 | Not known |
| wt % Magnesium | 0.74 | 0.53 | 0.33 | 0.27 | 0.61 |

Golf balls were formed by molding covers comprising a blend of Surlyn® AD8172, a hard magnesium neutralized ethylene-methacrylic acid ionomer, and one of the soft magnesium ionomers listed in Table 1 around a 1.580" diameter polybutadiene based core, where the core had a compression of 86 and COR of 0.785 at 125 ft/sec. The improved durability and golf ball properties of the golf balls having covers incorporating the magnesium ionomer blends of the invention is clearly demonstrated by the results given in Table 2.

450 hits. Moreover, the golf balls of Examples 3A and 4A, which were formed using soft magnesium ionomers having a flexural modulus of less than 4,000 psi, were softer than the prior art balls to provide better control of the ball on approach shots to the green, but, surprisingly, have a coefficient of restitution that is substantially the same as the prior art golf balls. Therefore, where the golf balls of the invention provide better feel and control when compared to prior art golf balls, they also provide substantially the same distance as the prior art golf balls.

TABLE 2

GOLF BALL PROPERTIES FOR DUAL MAGNESIUM IONOMER COVER BLENDS

| Ingredients | #1A | #2A | #3A | #4A | Control |
|---|---|---|---|---|---|
| Surlyn ® AD8172 - E-MMA-Mg ionomer Flex Modulus 51,600 psi | 55 | 55 | 55 | 55 | 55 |
| Surlyn ® 8542 - E-nBA-MAA ionomer Flex Modulus 6,630 psi | | | | | 45 |
| Exp. 1 - E-nBA-MAA-Mg ionomer Flex Modulus 6,560 psi | 45 | | | | |
| Exp. 2 - E-nBA-MAA-Mg ionomer Flex Modulus 5,530 psi | | 45 | | | |
| Exp. 3 - E-nBA-MAA-Mg ionomer Flex Modulus 3,820 psi | | | 45 | | |
| Exp. 4 - E-nBA-MAA-Mg ionomer Flex Modulus 3,550 psi | | | | 45 | |
| TiO$_2$ concentrate | 5 | 5 | 5 | 5 | 5 |
| Wt % Magnesium in the blend | 1.04 | 0.89 | 0.84 | 0.7 | 0.93 |
| Flexural Modulus (kpsi) 40 hours ASTM D-790-Method II/Proce. B | 27 | 24 | 25 | 18 | 15 |
| Ball Compression | 95 | 94 | 94 | 94 | 95 |
| Ball Cover HARDNESS (Shore-D after one week aging) | 63 | 63 | 62 | 60 | 64 |
| Ball Cover HARDNESS (Shore-C after one week aging) | 87 | 87 | 86 | 82 | 87 |
| Coefficient of Restitution @ 125 Ft/Sec | 0.790 | 0.789 | 0.790 | 0.786 | 0.789 |
| Number of hits to occurrence of first failure | 700 | 600 | 550 | none | 450 |
| Spin Rate from Driver (rpm) | 3412 | 3390 | 3453 | 3567 | 3426 |
| Spin Rate from 8-iron (rpm) | 8525 | 8504 | 8432 | 8552 | 8517 |
| Spin Rate from half-wedge (rpm) | 6728 | 6704 | 6854 | 7006 | 6664 |

Golf balls having covers according to the invention have unexpectedly superior durability. No failures occurred in hit tests using the golf balls of the invention having the softest covers, where prior art balls suffered failures in as few as The results of these tests demonstrate that magnesium ionomer blends of the invention provide a combination of improved durability, initial velocity, and spin that is not available with prior art golf ball cover compositions. In particular, golf balls having covers according to the present invention spin at a rate that is comparable to that of wound, balata covered balls, and have the durability and initial velocity of prior art two piece balls, having hard ionomer covers.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

I claim:

1. A golf ball having at least one layer, the at least one layer comprising at least one soft magnesium ionomer, wherein the at least one soft magnesium ionomer is a copolymer of an olefin, methacrylic acid, and at least one acrylate or methacrylate class ester, wherein at least a portion of the acid units are neutralized by magnesium cations, and wherein the at least one soft magnesium ionomer contains about 0.3 percent by weight magnesium based on the total weight of the ionomer, the at least one soft magnesium ionomer has a flexural modulus of from about 2,000 psi to 4,600 psi, and the layer is substantially free of any ionomers neutralized by a metal ion other than magnesium.

2. The golf ball according to claim 1, wherein the olefin is ethylene.

3. The golf ball according to claim 1, wherein the at least one soft magneseium ionomer has a flexural modulus of no more than about 3,500 psi.

4. The golf ball according to claim 1, wherein the at least one soft magnesium ionomer has a flexural modulus of from about 3,200 to about 3,400 psi.

5. The golf ball according to claim 1, wherein the at least one layer forms at least a portion of a cover or a core.

6. The golf ball according to claim 1, wherein the layer further comprises at least one hard magnesium ionomer having a flexural modulus of at least about 50,000 psi and a Shore D hardness of at least about 60.

7. The golf ball according to claim 6, wherein the layer comprises a blend of from about 95 to about 30 weight percent of the at least one hard magnesium ionomer and from about 5 to about 70 weight percent the at least one soft magnesium ionomer.

8. The golf ball according to claim 6, wherein the hard magnesium ionomer is a copolymer of ethylene and acrylic or methacrylic acid, having an acid content of from about 10 to about 30 percent by weight, wherein from about 30 to about 70 percent of the acid groups are neutralized with magnesium cations.

9. The golf ball according to claim 6, wherein the acid content of the at least one hard magnesium ionomer is from about 15 to about 25 percent by weight.

10. The golf ball according to claim 1, wherein the at least one soft magnesium ionomer is a terpolymer of ethylene, methacrylic acid, and n-butylacrylate or iso-butylacrylate, having an acid content of from about 8 percent to about 15 percent by weight.

11. A golf ball having at least one layer, the at least one layer comprising a blend of at least one hard magnesium ionomer and at least one soft magnesium ionomer, wherein the hard ionomer has a flexural modulus of at least about 50,000 psi and a Shore D hardness of at least about 60; the at least one soft magnesium ionomer comprises methacrylic acid and contains about 0.3 percent by weight magnesium based on the total weight of the ionomer, and has a flexural modulus of from about 2,000 psi to 4,600 psi; and wherein the layer is substantially free of any ionomers neutralized by a metal ion other than magnesium.

12. The golf ball of claim 11, wherein the hard magnesium ionomer is a copolymer of ethylene and acrylic or methacrylic acid, having an acid content of from about 10 to about 30 percent by weight, wherein from about 30 to about 70 percent of the acid groups are neutralized with magnesium cations, and the at least one soft magnesium ionomer is a terpolymer of ethylene, methacrylic acid, and n-butylacrylate or iso-butylacrylate, having an acid content of from about 8 percent to about 15 percent by weight.

13. A method of making a golf ball having at least one layer, the method comprising: forming a blend comprising at least one soft magnesium ionomer containing about 0.3 percent by weight magnesium based on the total weight of the ionomer, and having a flexural modulus of from about 2,000 psi to 4,600 psi, the at least one soft magnesium ionomer comprising monomeric units of an olefin and methacrylic acid, wherein at least a portion of the acid units are neutralized by magnesium cations, and molding the blend to form the at least one layer, wherein the layer is substantially free of any ionomers neutralized by a metal ion other than magnesium.

14. The method of claim 13, further comprising selecting ethylene as the olefin.

15. The method of claim 13, further comprising selecting a soft magnesium ionomer that further comprises monomeric units of at least one acrylate ester.

16. The method of claim 13, further comprising molding the layer around a golf ball core.

17. The method of claim 16, further comprising molding the layer to form at least a portion of a golf ball cover.

18. The method of claim 13, further comprising blending the at least one soft magnesium ionomer with at least one hard magnesium ionomer having a flexural modulus of at least about 50,000 psi and a Shore D hardness of at least about 60.

19. The method of claim 18, further comprising selecting a hard magnesium ionomer of a copolymer of ethylene and acrylic or methacrylic acid, having an acid content of from about 10 to about 30 percent by weight, wherein from about 30 to about 70 percent of the acid groups are neutralized with magnesium cations.

20. The method of claim 18, further comprising selecting a hard magnesium ionomer having an acid content of from about 15 to 25 percent by weight.

21. The method of claim 13, further comprising selecting a terpolymer of ethylene, methacrylic acid, and n-butylacrylate or iso-butylacrylate, having an acid content of from about 8 percent to about 15 percent by weight as the soft magnesium ionomer.

22. A golf ball having at least one layer, the at least one layer comprising at least one soft magnesium ionomer, wherein the at least one soft magnesium ionomer is a copolymer of an olefin, acrylic acid, and at least one acrylate or methacrylate class ester, wherein at least a portion of the acid units are neutralized by magnesium cations, and wherein the at least one soft magnesium ionomer contains about 0.4 percent by weight magnesium based on the total weight of the ionomer, the at least one soft magnesium ionomer has a flexural modulus of from about 2,000 psi to 4,600 psi, and the layer is substantially free of any ionomers neutralized by a metal ion other than magnesium.

23. A golf ball having at least one layer, the at least one layer comprising a blend of at least one hard magnesium ionomer and at least one soft magnesium ionomer, wherein the hard ionomer has a flexural modulus of at least about 50,000 psi and a Shore D hardness of at least about 60; the at least one soft magnesium ionomer comprises acrylic acid and contains about 0.4 percent by weight magnesium based on the total weight of the ionomer, and has a flexural modulus of from about 2,000 psi to 4,600 psi; and wherein the layer is substantially free of any ionomers neutralized by a metal ion other than magnesium.

24. A method of making a golf ball having at least one layer, the method comprising: forming a blend comprising at least one soft magnesium ionomer containing about 0.4 percent by weight magnesium based on the total weight of the ionomer, and having a flexural modulus of from about 2.000 psi to 4,600 psi, the at least one soft magnesium ionomer comprising monomeric units of an olefin and acrylic acid, wherein at least a portion of the acid units are neutralized by magnesium cations, and molding the blend to form the at least one layer, wherein the layer is substantially free of any ionomers neutralized by a metal ion other than magnesium.

25. The method of claim 24, further comprising selecting a terpolymer of ethylene, acrylic acid, and n-butylacrylate or iso-butylacrylate, having an acid content of from about 8 percent to about 15 percent by weight as the soft magnesium ionomer.

* * * * *